United States Patent [19]
Lawrey et al.

[11] Patent Number: 5,811,829
[45] Date of Patent: Sep. 22, 1998

[54] VISCOSITY STABLE ISOCYANATE-TERMINATED PREPOLYMERS AND POLYOXYALKYLENE POLYETHER POLYOLS HAVING IMPROVED STORAGE STABILITY

[75] Inventors: Bruce D. Lawrey, Charleston; Stephen D. Seneker, Sissonville; Nigel Barksby, Dunbar, all of W. Va.

[73] Assignee: ARCO Chemical Technology, L.P., Greenville, Del.

[21] Appl. No.: 513,264

[22] Filed: Aug. 10, 1995

[51] Int. Cl.$^6$ ............................................. C09K 3/02
[52] U.S. Cl. .................. 252/182.24; 252/182.27; 252/182.29
[58] Field of Search ............ 252/182.24, 182.27, 252/182.29

[56] References Cited

U.S. PATENT DOCUMENTS

| | | | |
|---|---|---|---|
| 3,427,256 | 2/1969 | Milgrom | 252/431 |
| 3,829,505 | 8/1974 | Herold | 260/611 |
| 4,156,759 | 5/1979 | Hostettler | 521/102 |
| 4,355,188 | 10/1982 | Herold et al. | 568/620 |
| 4,721,818 | 1/1988 | Harper et al. | 568/120 |
| 4,987,271 | 1/1991 | Watabe et al. | 568/621 |
| 5,010,047 | 4/1991 | Schuchardt | 502/24 |
| 5,132,387 | 7/1992 | Baron et al. | 528/49 |
| 5,158,922 | 10/1992 | Hinney et al. | 502/175 |
| 5,248,833 | 9/1993 | Hinney et al. | 568/621 |
| 5,356,976 | 10/1994 | Dubs et al. | 524/348 |
| 5,357,038 | 10/1994 | Reisch et al. | 528/414 |

FOREIGN PATENT DOCUMENTS 4145123  5/1992  Japan .

OTHER PUBLICATIONS

Herold et al., "Hexacyanocobaltate SAH Complexes as Cataylsts for Epoxide Polymerizations," Adv. Chem. Ser. No. 128 (1973) pp. 208–229.

Schuchardt et al., "Preparation of High Molecular Weight Polyols Using Double Metal Cyanide Catalysts," 32nd Annual Polyurethane Tech./Mark Conf. Oct. 1989.

Griffith et al., "The Autooxidation of Poly(propylene oxide)s.," Eur. Polym. J. 29 (1993) 437.

*Primary Examiner*—John M. Cooney, Jr.
*Attorney, Agent, or Firm*—Jonathan L. Schuchardt

[57] ABSTRACT

Polyoxyalkylene polyols containing double metal cyanide complexes or residues thereof as are produced during the preparation of polyoxyalkylene polyols by the double metal cyanide complex catalyzed oxyalkylation of a suitably functional hydric initiator are stable without catalyst removal. Isocyanate-terminated prepolymers prepared from such polyols are surprisingly viscosity-stable relative to similar prepolymers prepared from polyols not containing double metal cyanide complexes or residues thereof.

9 Claims, 2 Drawing Sheets

VISCOSITY STABLE ISOCYANATE-TERMINATED PREPOLYMERS AND POLYOXYALKYLENE POLYETHER POLYOLS HAVING IMPROVED STORAGE STABILITY

TECHNICAL FIELD

The present invention pertains to viscosity-stable isocyanate-terminated prepolymers and to polyoxyalkylene polyols having improved storage stability which may be used to prepare such prepolymers. More particularly, the present invention pertains to viscosity-stable isocyanate-terminated prepolymers prepared from a polyoxyalkylene polyether polyol component comprising a polyol containing a stabilizing amount of a double metal cyanide complex or residue thereof.

BACKGROUND ART

Polyether polyols useful in the production of polyurethane products generally have a high proportion of propylene oxide-derived oxypropylene moieties, and are prepared conventionally by the base catalyzed oxyalkylation of a suitably functional initiator molecule such as propylene glycol, glycerine, trimethylolpropane, sucrose, or the like. The propylene oxide used to prepare such polyols is subject to a competing rearrangement to allyl alcohol under the reaction conditions, as discussed in detail in BLOCK AND GRAFT POLYMERIZATION, Ceresa, Ed., John Wiley and Sons, New York, pp. 17–21. The monofunctional allyl alcohol species generated by the rearrangement competes with the desired initiator molecule and its oxyalkylated oligomers for propylene oxide, resulting in the presence of polyoxyalkylene monols in addition to the desired di-, tri-, or higher-functionality, initiator-derived polyoxyalkylene polyols. As the allyl alcohol species continues to be generated as the reaction proceeds, the mole percentage of monol continues to increase, and as a practical matter, polyol equivalent weights greater than c.a. 2000 Da are difficult to achieve. Even at these equivalent weights, the mole percentage of monol may approach 50 mol percent, and the theoretical functionality lowered from the nominal value of 2, in the case of a polyoxypropylene diol, to average functionalities approaching 1.5. The monofunctionality may be determined from measuring the unsaturation content of the polyol product, or by GPC analysis. As each monol contains a point of ethylenic unsaturation, titrametric measurement of the unsaturation is generally recognized as reflective of monol content.

Despite the drawbacks associated with base catalyzed oxypropylation, catalysts such as sodium and potassium hydroxide, and to a lesser extent the corresponding lower alkoxides, continue to be used commercially. At present, base-catalyzed polyols constitute the vast majority of commercially available polyether polyols for urethane applications. In addition to the previously described problems, basic catalyst residues must be removed from the polyol product. Both neutralization with acids, as well as use of solid adsorbents such as magnesium silicate have been used in the latter respect. However, the nature of the polyurethane reaction makes it in general very sensitive to catalyst residues, and many cases have been documented where the substitution of a neutralized polyol for one purified by use of an adsorbent or vice versa has caused polymer system failure.

In the decades of the '60s and early '70s, a new class of oxyalkylation catalysts based on double metal cyanide complexes such as the non-stoichiometric glyme complex of zinc hexacyanocobaltate were developed. These catalysts were found to enable preparation of higher molecular weight polyoxypropylene polyols having much lower levels of unsaturation than base-catalyzed analogs. See, for example, "Hexacyanometalate Salt Complexes As Catalysts For Epoxide Polymerizations", R. J. Herold et al., ADVANCES IN CHEMISTRY SERIES, No. 128, ©1973, American Chemical Society and Herold, U.S. Pat. No. 3,829,505, which disclose unsaturation in the range of 0.015 to 0.020 meq/g polyol achieved through the use of double metal cyanide complex catalyzed oxyalkylation. These references further disclose polyurethane foam preparation from freshly prepared polyether triols containing 240 ppm catalyst residues.

Although the presence of such large amounts of residual double metal cyanide catalyst residues in polyether polyols may not influence foam properties when used shortly after preparation, the storage stability of such products has been questioned due to production of volatile components over time. As polyether polyols destined for use in polyurethanes are often stored for extended periods, storage stability represents a significant commercial problem. See, e.g., J. L. Schuchardt et al., "Preparation of High Molecular Weight Polyols Using Double Metal Cyanide Catalysts", 32ND ANNULAR POLYURETHANE TECHNICAL MARKETING CONFERENCE, Oct. 1–4, 1989; and Herold et al., U.S. Pat. No. 4,355,188. Moreover, presence of double metal cyanide catalyst residues have been stated to result in increases in isocyanate prepolymer viscosity during storage, perhaps due to allophanate formation. See, e.g., Schuchardt, op. cit., and Herold '188 op. cit. As a result, numerous methods have been devised to remove double metal cyanide catalysts from polyoxyalkylene polyether polyols prepared therefrom. For example, U.S. Pat. No. 3,427,256 discloses deactivation with strong base followed by reprecipitating, or by treating the product with water or aqueous ammonia and centrifuging. The centrifugation and filtration steps add considerably to the cost of the product, however.

Hinney et al., U.S. Pat. No. 5,248,833 discloses double metal cyanide complex catalyst removal by combining the crude polyol with a $C_{1-6}$ aliphatic alcohol and a chelating agent such as ethylene diamine tetraacetic acid (EDTA) to form an insoluble complex, which is then removed via filtration. Heating the crude polyol with alkali metals or alkali metal hydroxides to remove double metal cyanide complex residues is disclosed in U.S. Pat. Nos. 4,355,188 and 4,721,818. Such chemical treatment processes generally destroy or "denature" the catalyst complex. U.S. Pat. No. 5,010,047 discloses dilution of crude polyol with a large amount of non-polar solvent such as hexane or toluene followed by filtration and removal of solvent. U.S. Pat. No. 4,987,271 discloses heating the crude polyol with a pH buffer solution, optionally adding a chelating agent, adding an adsorbent or ion exchange resin, and filtering. All these methods are time consuming, utilize considerable quantities of often expensive reagents, adsorbents, or ion-exchange resins, and are generally energy intensive.

SUMMARY OF THE INVENTION

It has now been unexpectedly discovered that double metal cyanide complexes, when present in amounts of from 50 to 250 ppm or higher, aid in stabilizing polyoxyalkylene polyether polyols, and do so in the range of 10–250 ppm and higher when used in conjunction with conventional antioxidants. These findings are believed to be statistically valid and reproducible, and allow for significant cost-reduction in double metal cyanide complex catalyzed polyether polyols and polyurethane products prepared therefrom. It has been further surprisingly discovered that increases in viscosity of isocyanate-terminated prepolymers prepared from such polyols occurs more slowly than when no double metal cyanide complex is present, contrary to the teachings of the art.

DESCRIPTION OF THE PREFERRED EMBODIMENTS

Figure 1:
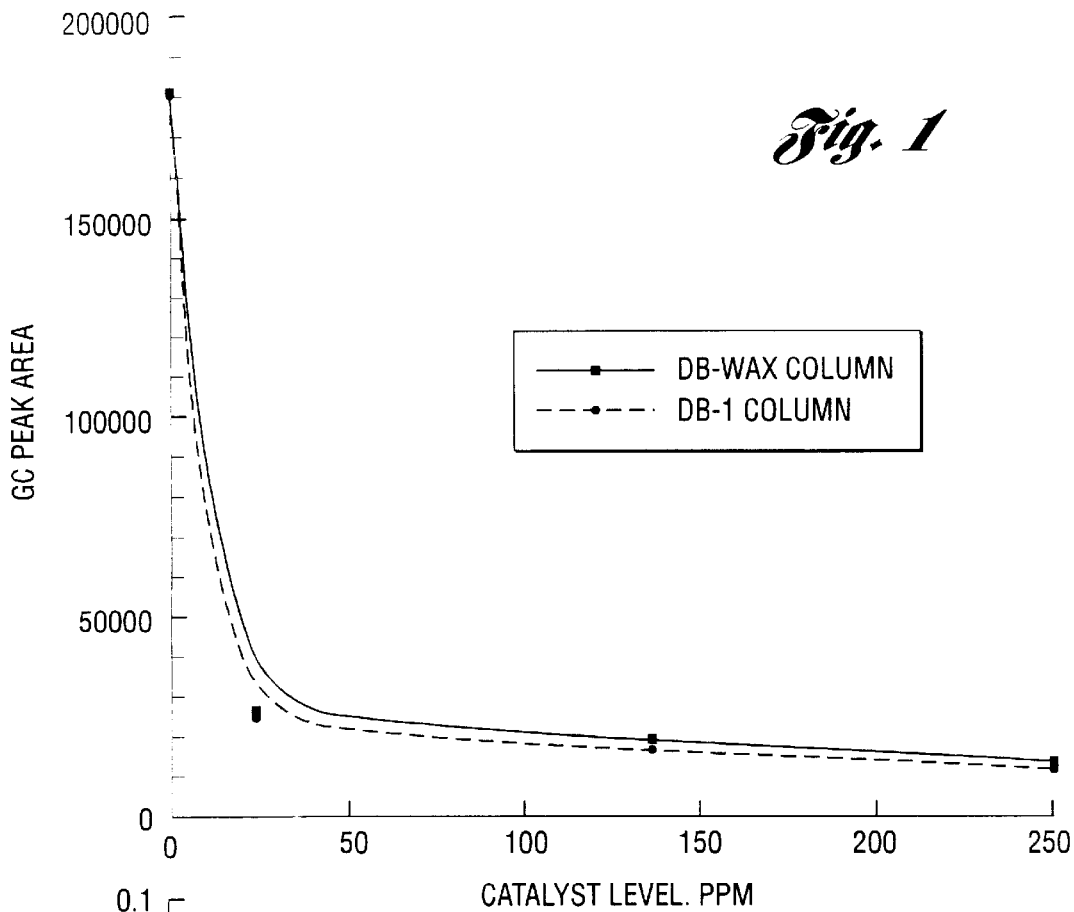
FIG. 1 illustrates measured total volatiles after storage of polyether polyols containing various levels of double metal cyanide complexes for 7 days at 100° C.

The polyoxyalkylene polyether polyols of the subject invention are advantageously prepared by oxyalkylation of a suitably functional hydric initiator in the presence of a catalytically effective amount of a double metal cyanide complex catalyst. Suitable initiator molecules include, but are not limited to, monohydric to octahydric and higher functional initiators as are commonly used in the preparation of polyoxyalkylene polyether polyols. Examples include aliphatic glycols and glycol ethers such as ethylene glycol, diethylene glycol, propylene glycol, dipropylene glycol, tripropylene glycol, 1,4-butanediol, and 1,6-hexanediol; cycloaliphatic diols such as the cyclopentane diols and cyclohexane diols, particularly 1,4-cyclohexane diol; aliphatic/cycloaliphatic diols such as cyclohexanedimethanol; aromatic diols such as catechol, hydroquinone, and resorcinol; aliphatic triols such as glycerine and trimethylolpropane; aliphatic tetrols such as pentaerythritol; and higher functionality, hydroxyl-functional initiators such as dipentaerythritol, tripentaerythritol, polyglycerol, sorbitol, mannitol, mannose, fructose, sucrose, α-methylglucoside, α-hydroxyethylglucoside, and the like.

Direct oxyalkylation of the foregoing low molecular weight initiators with double metal cyanide complex catalysts is generally inefficient and may additionally require long induction periods. For these reasons, use of oligomeric oxyalkylation products of such initiators, prepared by conventional base catalyzed oxyalkylation of the initiator to an equivalent weight of from 100 to about 700, is generally desired. As conventional basic catalyst residues may inactivate double metal cyanide complex catalysts, removal or neutralization of residual catalyst in the oligomeric initiator is preferred.

The oxyalkylation is performed with one or more alkylene oxides and/or oxetane, preferably with propylene oxide or mixtures of propylene oxide and ethylene oxide. Other alkylene oxides may be used as well, either solely or in admixture. Additional alkylene oxides include, but are not limited to 1,2- and 2,3-butylene oxide, styrene oxide, and α-alkylene oxides having from about 6 to about 30 carbon atoms in the alkylene residue.

The oxyalkylation catalyst is preferably a double metal cyanide complex catalyst, more preferably a zinc hexacyanocobalt complex catalyst. Suitable catalysts may be prepared as disclosed in U.S. Pat. Nos. 5,158,922 and 5,248,833, and U.S. patent application Ser. Nos. 08/156,534 and 08/302,296, which are now U.S. Pat. Nos. 5,470,813 and 5,482,908, respectively, which are herein incorporated by reference.

Complexing agents suitable for use in catalyst preparation include water-miscible, heteroatom-containing organic ligands such as those disclosed in U.S. Pat. No. 5,158,922, herein incorporated by reference. Preferred ligands are isopropyl alcohol, glyme, diglyme, and t-butylalcohol, particularly the latter, as well as oligomeric polyoxyalkylene polyols, which are also preferred when used in conjunction with t-butyl alcohol. In general, catalyst levels of from 10 ppm to 300 ppm based on the weight of the finished polyol product prior to any catalyst removal are preferred.

The polyoxyalkylene polyols thus prepared will contain double metal cyanide complex catalysts or double metal cyanide complex catalysts residues, in amounts of up to 1000 ppm, preferably not greater than 500 ppm, and more preferably in the range of 50 to 250 ppm. When used in conjunction with an effective, stabilizing amount of a conventional antioxidant, double metal cyanide complex catalysts or residues thereof may advantageously range from 10 ppm to 250 ppm, more preferably 25 ppm to 250 ppm.

The amount of catalyst or catalyst residue is determined by measuring analytically the amount of transition metals in the polyol, and back-calculating to the amount of double metal cyanide complex catalyst based on the stoichiometry of the particular catalyst used. For example, the zinc hexacyanocobaltate complex catalyst of Example 3 contains 6.9 weight percent cobalt. In a polyol containing 15 ppm cobalt prepared from such a catalyst, the back-calculation would result in a zinc hexacyanocobaltate complex content of 217 ppm (15/0.069).

The double metal cyanide complex catalyst and/or residue may be present in heterogenous form, or in solution. For example, with prior art catalysts prepared conventionally using glyme as the complexing ligand, although the catalyst is initially present as a solid (heterogenous) in the reaction mixture, during the course of the oxyalkylation, the solid catalyst becomes solubilized, and thus cannot be readily removed by filtration. In prior art products, such soluble catalyst residues, which may still exhibit some, albeit reduced, catalytic activity, have been removed by denaturing, e.g., by chemically reacting to form a filterable precipitate. It has now been surprisingly discovered that such solubilized catalysts or catalyst residues may be retained in the polyol product without denaturing or otherwise removing the catalyst.

When the preferred, substantially amorphous double metal cyanide complex catalysts such as those of Examples 1 and 3 herein are used for oxyalkylation, the bulk of the catalyst may remain in substantially heterogenous (solid) form. Such catalysts may be removed by filtration, and the solid catalyst so separated retains substantial catalytic activity. For relatively complete catalyst removal, however, the filtration must be through a relatively fine-pored filter, and in view of the polyol viscosity, such filtration is time-consuming. According to the present invention, such residual catalysts may be left in the polyol product, or alternatively, a coarse-pored filter may be used to remove a substantial portion of catalyst, leaving from 50 to 1000 ppm of catalyst or catalyst residue in the polyol, or 10 ppm to preferably 250 ppm if the polyol is to be stabilized with an antioxidant stabilizer package. Use of a coarse filter speeds up the filtration, resulting in lower overall process time and thus reduced cost, without detracting from the stability of the polyol product, but rather enhancing polyol storage stability.

The polyol storage stability may be assessed by standard techniques as described hereinafter, preferably by head space gas chromatography due to the ease and rapidity with which such analysis may be made. The storage stability should be greater, as indicated by total volatiles and/or acid number or carbonyl content, than an otherwise similar polyol prepared by oxyalkylating with a double metal cyanide complex catalyst from which catalyst and catalyst residues have been removed by one or more of the treatments previously described such that the polyol contains between 0–5 ppm residual catalyst or catalyst residue.

It is particularly preferred that the double metal cyanide complex-containing polyoxyalkylene polyether polyols further contain an effective, stabilizing amount of one or more antioxidants. Such antioxidants include, for example, hindered phenolic antioxidants such as butylated hydroxytoluene (BHT) and the hindered phenols disclosed in U.S. Pat. No. 4,156,759, herein incorporated by reference; 2,6-dialkyl-6-sec-alkyl phenols such as those disclosed in U.S. Pat. No. 5,356,976, herein incorporated by reference; secondary amine antioxidants such as octyldiphenylamine and those disclosed in the aforementioned U.S. Pat. No. 4,156,759; organophosphites such as tris-(nonylphenyl)phosphite, hindered phenol phosphites, esters of thiopropionic acid such as dilaurylthiodipropionate, thiocarbonates, phenothiazine, and the like. The various cinnamic acid esters are further useful. Additional antioxidants include those disclosed in U.S. Pat. No. 5,132,387. The amount of antioxidant may vary, for each antioxidant, from about 10 ppm to about 10,000 ppm, preferably 50 ppm to 800 ppm, and particularly about 500 ppm, based on polyol weight. Non amino-group-containing antioxidants are preferred.

The viscosity-stable, isocyanate-terminated prepolymers of the subject invention are prepared by reacting a stoichiometric excess of a di- or polyisocyanate with a polyoxyalkylene polyol containing from 10 ppm to 1000 ppm or more of double metal cyanide complex stabilizer, preferably 25 ppm to 250 ppm, more preferably 25 ppm, and advantageously 50 ppm to 100 ppm. The prepolymer may be prepared conventionally by reacting the components neat or in non-reactive solvent, with or without the use of urethane promoting catalysts such as, but not limited to, the various tin salts such as dibutyltin diacetate and dibutyltin dilaurate. The isocyanate-terminated prepolymers may advantageously contain from 1 to about 25 weight percent NCO groups, preferably 4 to 22 weight percent, and more preferably about 5 to about 15 weight percent. Methods of prepolymer preparation may be found in the POLYURETHANE HANDBOOK, Gunter Oertel, Ed., Hanser Publishers, Munich, ©1985, and POLYURETHANES: CHEMISTRY AND TECHNOLOGY, J. H. Saunders and K. C. Frisch, Interscience Publishers, New York, 1963. Most surprisingly, despite the admonitions of the prior art, isocyanate-terminated prepolymers containing double metal cyanide complexes exhibit no greater increase in viscosity than those prepared using polyols from which double metal cyanide complex catalyst residues have been removed. Moreover, as the concentration of double metal cyanide complex in the polyether polyol used to prepare the prepolymer increases to 250 ppm or more, the storage stability, as reflected by change in viscosity, appears to increase as well. By the term "viscosity-stable" is meant that the prepolymer viscosity increases no more than about 15%, and preferably 10% or less after storage for one month at 50° C.

Double metal cyanide complex catalysts are generally initially insoluble in the starter molecules and oligomeric immediate reaction products. However, as oxyalkylation proceeds, in many if not most cases, the catalyst becomes solubilized, perhaps due to either the different solubility parameters of the higher weight polyether polyol as compared to those of the starter and/or lower molecular weight oligomers, or perhaps due to changes in catalyst chemical makeup and/or morphology. In the case of catalysts such as those of Example 1, the catalyst residues may be recovered and still exhibit catalytic activity. However, other catalysts are difficult to remove due to their being solubilized in the product. By the term "double metal cyanide complex catalyst residue" and like terms is meant the catalysts per se, or their degradation and/or reaction products as may be found in the crude, filtered, or chemically treated product. The presence of residues may be ascertained by measuring residual metal concentrations. The concentration of catalyst or catalyst residues expressed in parts per million (ppm) herein are relative to total polyol weight and expressed as ppm, as described previously.

Having generally described this invention, a further understanding can be obtained by reference to certain specific examples which are provided herein for purposes of illustration only and are not intended to be limiting unless otherwise specified.

Examples 1–4 illustrate preparation of preferred double metal cyanide complex catalysts.

EXAMPLE 1

Potassium hexacyanocobaltate (8.0 g) was added to deionized water (150 mL) in a beaker, and the mixture blended with a homogenizer until the solids dissolved. In a second beaker, zinc chloride (20 g) was dissolved in deionized water (30 mL). The aqueous zinc chloride solution was combined with the solution of the cobalt salt using a homogenizer to intimately mix the solutions. Immediately after combining the solutions, a mixture of tert-butylalcohol (100 mL) and deionized water (100 mL) was added slowly to the suspension of zinc hexacyanocobaltate, and the mixture homogenized for 10 min. The solids were isolated by centrifugation, and were then homogenized for 10 minutes with 250 mL of a 70/30 (v:v) mixture of t-butylalcohol and deionized water. The solids are again isolated by centrifugation, and finally homogenized for 10 minutes with 250 mL of t-butylalcohol. The catalyst was isolated by centrifugation, and dried in a vacuum oven at 50° C. and 30 in. (Hg) to constant weight.

EXAMPLE 2

The procedure of Japanese patent application Kokai No. 4-145123 was generally followed. Potassium hexacyanocobaltate (4.0 g) was added to deionized water (75 mL) in a beaker, and the mixture stirred until the solids dissolved. In a second beaker, zinc chloride (10 g) was dissolved in deionized water (15 mL). The aqueous zinc chloride solution was combined with the solution of the cobalt salt using a magnetic stirring bar to mix the solutions. Immediately after combining the solutions, a mixture of tert-butylalcohol (50 mL) and deionized water (50 mL) was added slowly to the suspension of zinc hexacyanocobaltate, and the mixture conventionally stirred for 10 minutes. The solids were isolated by centrifugation, and then stirred for 10 minutes with 100 mL of a 70/30 (v:v) mixture of t-butylalcohol and deionized water. The solids were again isolated by centrifugation, and finally stirred for 10 minutes with 100 mL of a t-butylalcohol. The catalyst was isolated by centrifugation, and dried in a vacuum oven at 50° C. and 30 in. (Hg) to constant weight.

EXAMPLE 3

A one-gallon glass pressure reactor was charged with a solution of potassium hexacyanocobaltate (40 g) in DI water (700 mL) (Solution 1). Zinc chloride (125 g) was dissolved in a beaker with DI water (200 mL) (Solution 2). T-butylalcohol (500 mL) was dissolved in a beaker with Dl water (500 mL) (Solution 3). A fourth mixture (Solution 4) was prepared by suspending a 4000 mol. wt. poly (oxypropylene) diol (60 g), in DI water (1000 mL) and t-butylalcohol (10 mL).

Solutions 1 and 2 were combined with stirring at 300 rpm followed immediately by slow addition of Solution 3 to the resulting zinc hexacyanocobaltate mixture. The stirring rate was increased to 900 rpm, and the mixture stirred for 2 h at room temperature. The stirring rate was then reduced to 300 rpm, and Solution 4 added. The product was mixed for 5 min., and filtered under pressure to isolate the solid catalyst.

The isolated solids were reslurried in t-butylalcohol (700 mL) and DI water (300 mL) and stirred at 900 rpm for 2 h. The stirring rate was reduced to 300 rpm, and 60 g of the 4000 mol. wt. polyoxypropylene diol added. The mixture was stirred for 5 min., and filtered.

The solids were reslurried in t-butylalcohol (1000 mL) and stirred at 900 rpm for 2 h. The stirring rate was reduced to 300 rpm, and 30 g of the 4000 mol. wt. poly (oxypropylene) diol added. The mixture was stirred for 5 min., and filtered. The resulting solid catalyst was dried under vacuum at 50° C. (30 in. Hg) to constant weight. The catalyst was easily crushed to a fine, dry powder.

Elemental, thermogravimetric, and mass spectral analyses of the solid catalyst show: polyol=45.8 wt. %; tert-butylalcohol=7.4 wt. %; cobalt=6.9 wt. %.

EXAMPLE 4

A solution of zinc chloride (26.65 g; 0.1956 mole) in water (26.65 g) was added rapidly to an agitated solution of potassium hexacyanocobaltate (13.00 g, 0.0391 mole) in water (263.35 g). The potassium hexacyanocobaltate solution was maintained at 40° C. during addition of the zinc chloride solution. A colorless precipitate of zinc hexacyanocobaltate particles formed immediately upon addition. After stirring for 15 minutes at 40° C., dimethoxyethane (84.00 g; 0.9321 mole) was added to the aqueous catalyst slurry. The resulting mixture was stirred for an additional 30 minutes and the zinc hexacyanocobaltate zinc chloride dimethoxyethane water complex catalyst recovered by filtration using a horizontal basket centrifugal filter and a light weight nylon fabric filter medium. After washing with 300 mL dimethoxyethane and drying in air at ambient temperature and pressure, the filter cake obtained was quite soft and could be easily crushed to a fine powder.

Example 5 illustrates polyol preparation using double metal cyanide complex catalysts.

EXAMPLE 5

A two-gallon stirred reactor is charged with a 450 Da polyoxypropylene diol starter and the zinc hexacyanocobaltate catalyst of Example 1 at a level corresponding to 250 ppm in the finished polyol. The mixture is stirred and heated to 105° C., and is stripped under vacuum to remove traces of water from the starter. A minor amount of propylene oxide is fed to the reactor, initially under a vacuum of 30 in. (Hg), and the reactor pressure is monitored carefully. Additional propylene oxide is not added until an accelerated pressure drop occurs in the reactor; the pressure drop is evidence that the catalyst has become activated. When catalyst activation is verified, sufficient propylene oxide to result in a 4000 Da polyoxypropylene diol product is added gradually over about 2 h while maintaining a reactor pressure less than 40 psi. After propylene oxide addition is complete, the mixture is held at 105° C. until a constant pressure is observed. Residual unreacted monomer is then stripped under vacuum from the polyol product. The hot polyol product is filtered at 100° C. through a filter cartridge (0.45 to 1.2 microns) attached to the bottom of the reactor to remove the catalyst. The product polyol has a hydroxyl number of c.a. 27 and a measured unsaturation of about 0.005 meq/g unsaturation per gram of polyol.

Polyoxyalkylene polyether polyols are believed to autooxidize by a free radical mechanism in which oxygen is absorbed and reacts to form hydroperoxides. At elevated temperatures, the hydroperoxides readily decompose to form a variety of carbonyl species and water. Among the carbonyl species which may be identified are aldehydes, ketones, organic acids, and esters. See, e.g., "The Autoxidation of Poly(propylene oxide)s", P. J. F. Griffiths et al., EUR. POLYM. J., Vol. 29, No. 213, pp. 437–442 (1993).

Various known methods may be utilized to assess polyol stability. These include headspace gas chromatography where area counts of the various volatile species which accumulate over stored polyol are indicative of total volatiles; and conventional wet chemical methods for measuring acid number and carbonyl content. The wet chemical methods have the advantage of detecting non-volatile as well as volatile species.

FIG. 1 illustrates the improvement in polyol stability which occurs at a double metal cyanide complex concentration between about 10 ppm and extending to greater than 250 ppm as indicated by total volatiles measured by headspace gas chromatography. The catalyst residues are from oxypropylation conducted with the catalyst of Example 1 to a molecular weight of c.a. 4000 Da. The data points represent refined polyol (≅0 ppm); filtered polyol (25 ppm); crude polyol (250 ppm); and a 50:50 w/w blend of crude and filtered polyols (137.5 ppm). The polyol contains 500 ppm BHT stabilizer. Samples taken after 7 days of storage at 100° C. were analyzed on a Perkin-Elmer Sigma 2000 Gas Chromatograph using both DB-wax (Hewlitt-Packard Innowax) and DB-1 (Restek RTX-1) columns. Samples were thermostatted for 20 minutes at 100° C. prior to sampling headspace. The injector and detector temperatures were both 250° C., initial oven temperature 50° C. with a hold time of 10 minutes followed by a 10° C./min ramp to 220° C. with a hold time of 15 minutes. As can be seen, both columns gave nearly identical results. The increase in polyol stability is striking, and clearly contrary to the direction predicted by the art.

Figure 2:
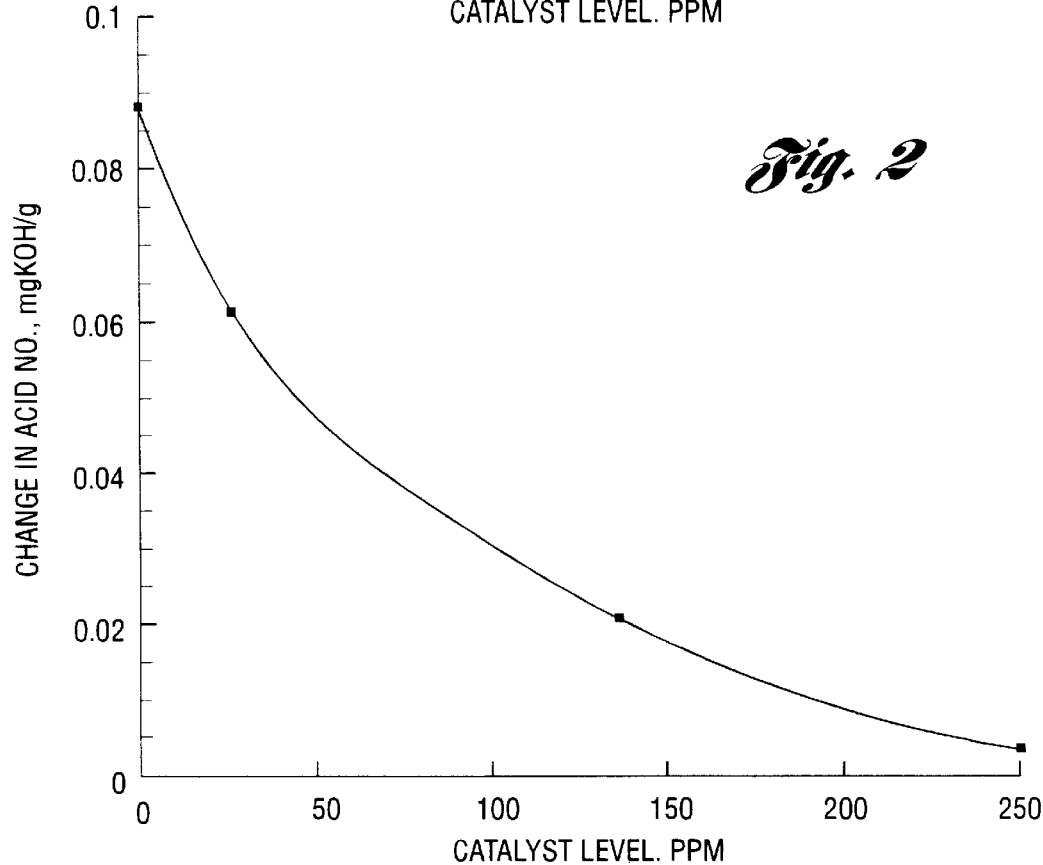
FIG. 2 illustrates the effect of double metal cyanide complex concentration on polyol acid number after storage at 100° C. for 7 days.
Figure 3:
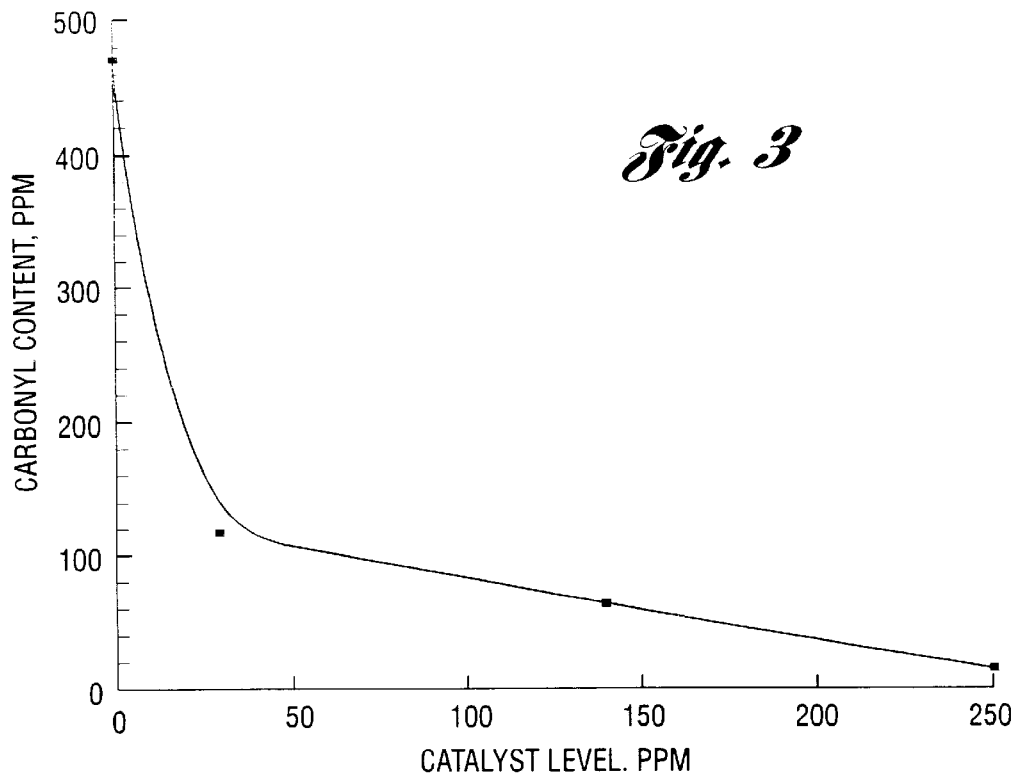
FIG. 3 illustrates the effect of double metal cyanide complex on carbonyl content after storage at 100° C. for 7 days.

FIGS. 2 and 3 illustrate change in acid number and carbonyl content after storage, respectively, of the same polyols and polyol blends as illustrated in FIG. 1. Increase in stability as measured by the latter parallels that indicated by total volatiles and, again is quite striking. Acid number also shows a decrease from the value exhibited in the absence of double metal cyanide complex.

Figure 4:
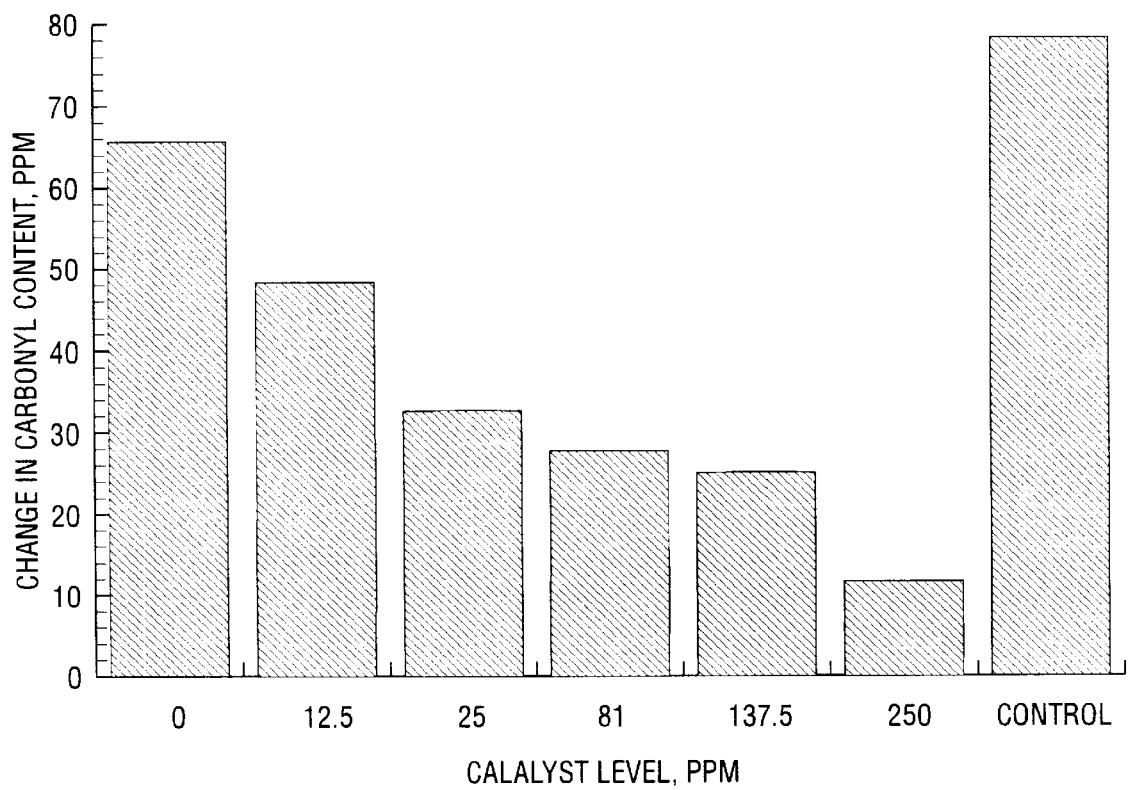
FIG. 4 illustrates change of carbonyl content of a conventionally catalyzed polyol and polyols containing various levels of double metal cyanide catalysts.

FIG. 4 illustrates the effect of various concentrations of residual double metal cyanide.glyme catalyst on a BHT stabilized polyol. The polyols of FIG. 4 were a refined 4000

Da polyol prepared using a double metal cyanide.glyme complex catalyst (≅0 ppm); a filtered polyol (25 ppm); a 50:50 blend of refined and filtered polyols (12.5 ppm); a crude, unrefined polyol (250 ppm); a 75:25 w/w blend of filtered and crude polyols (81.25 ppm); and a 50:50 w/w blend of crude and filtered polyols (137.5 ppm). The control is a c.a. 4000 Da molecular weight, conventionally catalyzed (KOH) polyoxypropylene glycol. Marked improvement in polyol stability occurs even at 12.5 ppm residual catalyst, with approximately 50 ppm providing for a c.a. 100% improvement in stability as measured by carbonyl content.

EXAMPLE 6

A series of 6% NCO terminated prepolymers were prepared by reacting 4,4'-methylene diphenylene diisocyanate (Mondur® M, available from Miles, Inc.) with a 4000 Da molecular weight polyoxypropylene diol prepared using double metal cyanide complex catalysts such as those prepared in Examples 1, 3 and 4. The prepolymers, containing various levels of residual catalyst, were stored under nitrogen at 50° C. The viscosity was measured after one month of storage. The results, reported in percent viscosity change relative to initial viscosity, are reported in Table 1. As can be seen, the viscosity change was less for prepolymers containing residual catalyst as compared to the prepolymer from which all residual catalyst had been removed.

TABLE 1

| | % Change in Viscosity After 1 Month @ 50° C. | | |
|---|---|---|---|
| Catalyst Level | Catalyst of Example 1 | Catalyst of Example 3 | Catalyst of Example 4 |
| 0 ppm | 9.5 | 9.3 | 8.7 |
| 25 ppm | 7.8 | 8.8 | 6.8 |
| 137 ppm | 8.7 | — | — |
| 250 ppm | 8.2 | 8.9 | 5.8 |

Having now fully described the invention, it will be apparent to one of ordinary skill in the art that many changes and modifications can be made thereto without departing from the spirit or scope of the invention as set forth herein.

What is claimed is:

1. A storage stable polyoxyalkylene polyol component having a nominal calculated functionality of between 1.5 and 8, prepared by oxyalkylating one or more polyhydric initiators with one or more alkylene oxides in the presence of one or more double metal cyanide complex catalysts, said polyoxyalkylene component containing from 10 to about 1000 ppm, of double metal cyanide complex catalysts and/or double metal cyanide complex catalyst residues, and a stabilizing effective amount of one or more antioxidants;

wherein said polyol component exhibits greater storage stability than an otherwise similar polyol component containing substantially no double metal cyanide complex catalyst and/or double metal cyanide complex catalyst residues.

2. The polyoxyalkylene polyol component of claim 1 wherein said double metal cyanide complex catalyst and/or double metal cyanide complex catalyst residue is present in an amount of from 25 to about 500 ppm based on the weight of said polyol component.

3. The polyoxyalkylene polyol component of claim 1 wherein said double metal cyanide complex catalyst and/or double metal cyanide complex catalyst residue is present in an amount of from 25 to about 250 ppm based on the weight of said polyol component.

4. The polyoxyalkylene polyol component of claim 1 wherein said antioxidant is a non-amino group-containing antioxidant.

5. The polyoxyalkylene polyol component of claim 1 wherein said antioxidant comprises a hindered phenol antioxidant.

6. The polyoxyalkylene polyol component of claim 2 wherein said antioxidant comprises a hindered phenol antioxidant.

7. The polyoxyalkylene polyol component of claim 1 wherein said antioxidant comprises butylated hydroxy toluene.

8. A storage stable polyoxyalkylene polyol comprising from greater than 25 ppm to about 1000 ppm of one or more double metal cyanide complexes or a residue thereof, based on the weight of said polyol, said polyol exhibiting a storage stability greater than an otherwise similar polyol containing substantially none of said double metal cyanide complex or residue thereof.

9. The polyol of claim 8 wherein said amount of double metal cyanide complex or residue thereof contained in said polyol is from about 50 ppm to about 250 ppm.

* * * * *

UNITED STATES PATENT AND TRADEMARK OFFICE
CERTIFICATE OF CORRECTION

PATENT NO : 5,811,829
DATED : September 22, 1998
INVENTOR(S) : Lawrey et al.

It is certified that error appears in the above-identified patent and that said Letters Patent is hereby corrected as shown below:

Claim 1, line 4 delete "1000" and insert in place thereof 250.

Claim 2, line 16 delete "500" and insert in place thereof 250.

Column 10, claim 8, line 35 delete "1000" and insert --250--.

Signed and Sealed this

Twentieth Day of July, 1999

Attest:

Q. TODD DICKINSON

*Attesting Officer*    Acting Commissioner of Patents and Trademarks